United States Patent [19]
Andrews, Sr.

[11] 3,735,461
[45] May 29, 1973

[54] TOOL HOLDER WITH ANGLE-INDEX

[76] Inventor: Edward N. Andrews, Sr., 6490 Malvern Drive, Troy, Mich. 48084

[22] Filed: Feb. 16, 1971

[21] Appl. No.: 115,412

[52] U.S. Cl. .................................... 29/98, 82/36 R
[51] Int. Cl. ............................................ B26d 1/00
[58] Field of Search .................. 29/98; 82/36, 37

[56] References Cited

UNITED STATES PATENTS

| | | | |
|---|---|---|---|
| 3,102,441 | 9/1963 | Milewski | 29/98 X |
| 2,812,678 | 11/1957 | Boley | 82/36 |
| 402,394 | 4/1889 | Brown | 29/98 X |

FOREIGN PATENTS OR APPLICATIONS

| | | | |
|---|---|---|---|
| 413,597 | 5/1946 | Italy | 29/98 |

*Primary Examiner*—Leonidas Vlachos
*Attorney*—Donnelly, Mentag & Harrington

[57] ABSTRACT

A turning tool holder for turret lathes, lathes, automatic turning machines, and similar tools, which is provided with an angle-index dial and cam means for indexing the tool holder to accommodate turning tools having various side cutting edge angles.

4 Claims, 9 Drawing Figures

INVENTOR.
EDWARD N. ANDREWS, SR.
BY Donnelly, Maentag & Harrington
ATTORNEYS

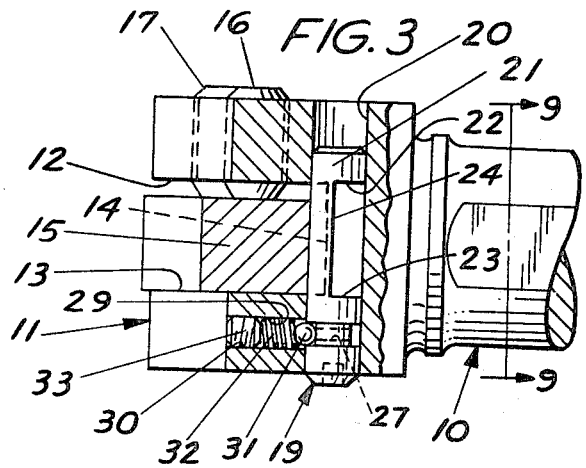
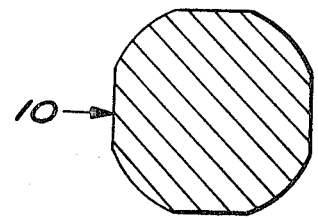
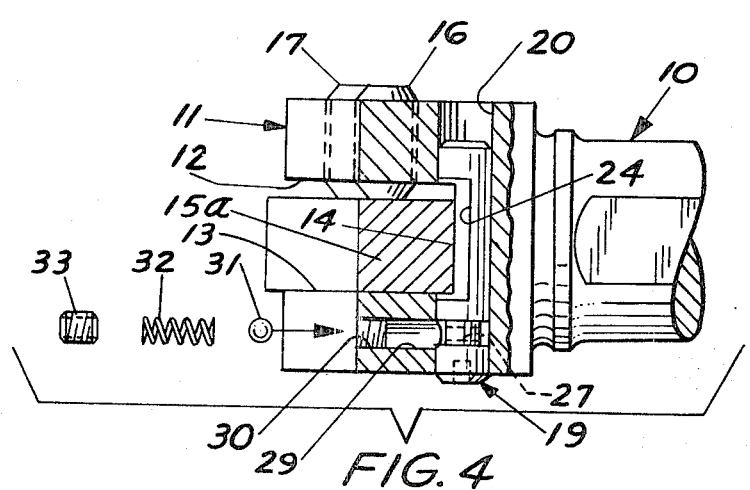
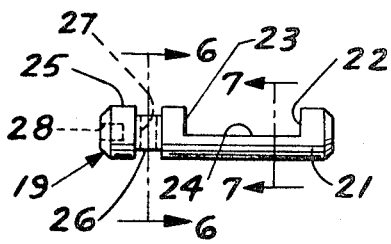 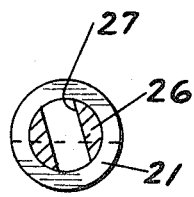 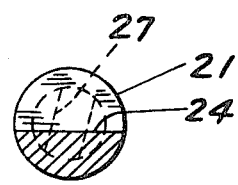
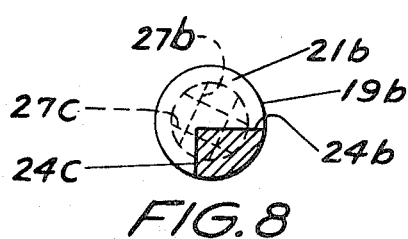

TOOL HOLDER WITH ANGLE-INDEX

SUMMARY OF THE INVENTION

This invention relates generally to turning cutting tool holders, and more particularly to a tool holder which is adapted to accept standard turning tools with various side cutting edge angles.

Heretofore, the turning tool holders adapted for use on turret lathes, lathes, automatic turning machines and similar machines have employed tool holders adapted to accept a tool bit with a particular side cutting edge angle. A disadvantage of the prior art tool holders is that it is necessary to change the entire tool holder when it is desired to change from one tool bit having a certain side cutting edge angle to another tool bit having a different side cutting edge angle. Accordingly, in view of the foregoing, it is an important object of the present invention to provide a turning tool holder which overcomes the aforementioned disadvantage of the prior art tool holders.

It is another object of the present invention to provide a novel and improved turning tool holder which is provided with adjustment means so that the tool holder is adjustable to accept standard manufactured tools having various side cutting edge angles.

It is still another object of the present invention to provide an adjustable turning tool holder which is adapted to accept tool bits of various side cutting edge angles and which is simple and compact in construction, economical to manufacture and efficient in operation.

It is still another object of the present invention to provide a novel and improved adjustable turning tool holder which includes a cutter slot and a rotatable cam inserted at the base of the cutter slot. The axis of said cam is parallel to the base of the cutter slot and square to the sides of the tool holder, and it is positioned adjacent one end of the cutter slot. One end of the cam extends outwardly of the body of the cutter block and it is provided with an index dial which is adapted to be aligned with indicia on the face of the cutter block body to indicate the angle at which the cam is set. The cam is provided with a plurality of notches on its outer diameter which are aligned with the base of the cutting tool slot and at various positions relative to the axis of the cam, whereby a turning tool inserted in the cutter slot may be positioned against one of the various notches on the rotatable cam or the outer diameter thereof to hold the tool at a desired angle.

It is a further object of the present invention to provide a novel and improved turning tool holder, including a shank, a tool block carried by said shank and provided with a turning tool slot having an angled base wall for holding a turning tool having a first side cutting edge angle, adjustable means extendable into said turning tool slot for positioning turning tools having various side cutting edge angles different than said first side cutting edge angle in said tool block, and means for retaining a turning tool in said tool slot.

Other objects, features and advantages of this invention will be apparent from the following detailed description, appended claims, and the accompanying drawings.

BRIEF DESCRIPTION OF THE DRAWINGS

FIG. 3 is a fragmentary, horizontal section view of the structure illustrated in FIG. 1, taken along the line 3—3 thereof, and looking in the direction of the arrows, and showing the angle-index cam turned to the 10° tool position.

FIG. 4 is a view similar to FIG. 3, and showing the angle-index cam turned to the 15° tool position, and with some of the parts shown in an exploded condition to show their assembly.

FIG. 5 is a side elevational view of the angle-index cam employed in the present invention.

FIG. 6 is an enlarged, elevational section view of the structure illustrated in FIG. 5, taken along the line 6—6 thereof, and looking in the direction of the arrows.

FIG. 7 is an enlarged, elevational section view of the structure illustrated in FIG. 5, taken along the line 7—7 thereof, and looking in the direction of the arrows.

FIG. 8 is an elevational section view, similar to FIG. 7, and showing a modified angle-index cam notched to provide settings for three different angled turning tools.

FIG. 9 is an elevational section view of the shank structure illustrated in FIG. 3, taken along the line 9—9 thereof, and looking in the direction of the arrows.

DESCRIPTION OF THE PREFERRED EMBODIMENTS

Figure 1:
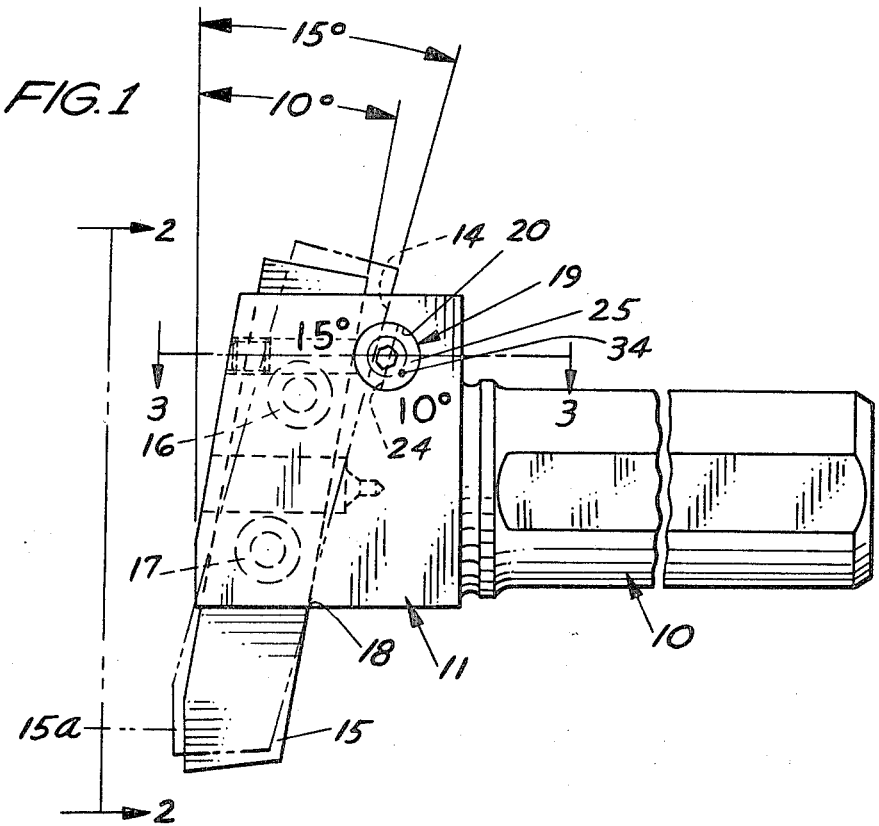
FIG. 1 is a side elevational view, with parts broken, of an adjustable turning tool holder made in accordance with the principles of the present invention.
Figure 2:
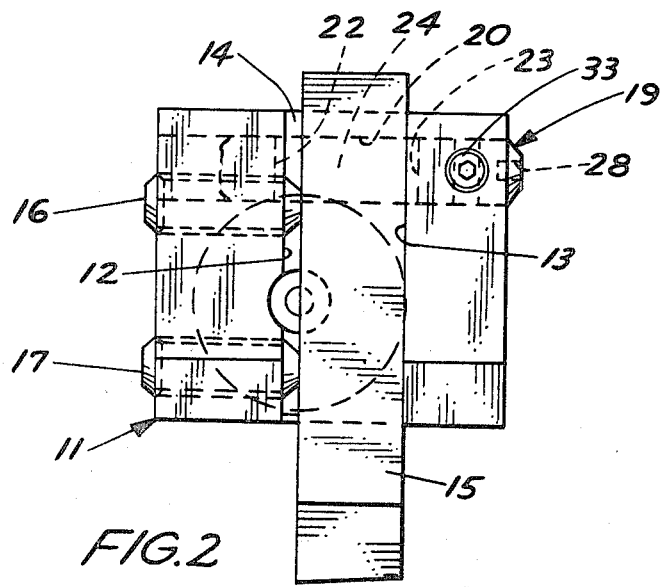
FIG. 2 is a left end elevational view of the structure illustrated in FIG. 1, taken along the line 2—2 thereof, and looking in the direction of the arrows.

Referring now to the drawings and in particular to FIGS. 1 and 2, the numeral 10 generally designates a conventional tool holder shank which carries a tool holder block generally indicated by the numeral 11. As best seen in FIGS. 2 and 3, the tool holder block 11 is provided with a cutter slot which is open on the left side of the block, as viewed in FIG. 3, and which is bounded by the side walls 12 and 13 and the base wall 14. As best seen in FIG. 1, the cutter slot base wall or surface 14 is disposed at a 15° angle from a plane perpendicular to the axis of rotation of the shank 10.

The numeral 15 in FIG. 1 designates a conventional turning tool having a 15° side cutting edge angle which is disposed in the cutting tool slot, and which has one side thereof resting against the base wall 14 of the cutter slot. As best seen in FIG. 2, the cutting tool 15 is secured in place by a pair of set screws 16 and 17 which hold the turning tool 15 against the cutter slot wall 13.

The numeral 15a in FIG. 1 designates a 10° side cutting edge angle turning tool which is held in a 10° position by an adjustable angle-index cam means generally indicated by the numeral 19. The lower end of the tool 15a is in contact against a fulcrum 18 at one end of the cutter slot and in contact with the outer surface or diameter of the angle-index cam 19 at the other end of the cutter slot. As shown in FIG. 3, the angle-index cam 19 is rotatably mounted in a transverse bore 20. As shown in FIGS. 3 and 5, the angle-index cam 19 includes a cylindrical body portion 21 in which is formed a longitudinally extended notch that is bounded by the end surfaces 22 and 23 and the longitudinally extended flat surface 24. The longitudinal surface of the notch 24 is disposed radially outward beyond the longitudinal axis of the cam 19. As best seen in FIGS. 5 and 6, the cam 19 is provided with a head 25 which is connected by the integral neck portion 26 to the cam body 21. A transverse detent hole 27 is formed through the neck 26. The cam head 25 is provided with an integrally extended, hexagonically shaped recess 28 for the reception of a wrench, such as an Allen wrench, for indexing the cam 19, between the 10° and 15° positions illustrated in FIGS. 1, 3 and 4.

As shown in FIGS. 3 and 4, the tool holder block 11 is provided with a bore 29 which opens at its inner end in a position in alignment with the detent bore 27 in the cam neck 26. The outer end of the bore 29 communicates with an enlarged threaded hole 30 which communicates with the exterior of block 11. Slidably mounted in the bore 29 is a detent spring 32 which is adapted to bias the detent ball 31 into the radial groove or slot between the cam head 25 and the body 21 and into a retaining engagement with the outer end of the detent hole 27 when the cam 19 is in either the 10° position illustrated in FIG. 3 or rotated to the 15° position shown in FIG. 4. The detent spring 32 is retained in the bore 29 by a rotatably adjustable set screw 33 which is threadably mounted in the threaded hole 30. As shown in FIG. 1, an indicia mark 34 is formed on the outer face of the cam head 25 to indicate that when the cam is turned with the indicia mark 34 opposite the indicia marking of 10° on the outer face of the tool holder block 11, the cam 19 is in the 10° position. A 15° mark is formed on the face of the block 11 in a position opposite to the 10° mark which would indicate that the cam 19 is in the 15° position when the indicia 34 on the cam is disposed adjacent the 15° mark.

FIG. 8 indicates a modified cam 19b and the parts thereof which correspond to the first described cam 19 have been marked with the same reference numerals followed by the small letter b. The modified cam 19b of FIG. 8 is provided with an additional notch formed at 90° to the first described notch and having a base surface 24c. The cam 19b is also provided with a second detent hole 27c disposed at 90° to the detent hole 27. It will be understood that the modified cam of FIG. 8 permits the cam 19b to be turned to three positions to permit a tool holder provided with the cam 19b to be adjusted to hold three different angled turning tools. It will be understood from an inspection of cams 19 and 19b that this cam may be provided with a plurality of notches, as desired, to permit the tool holder of the present invention to hold many different angled turning tools.

It will be seen that the tool holder of the present invention is adapted to be used on turret lathes, lathes, automatic turning machines and similar machine. The tool holder of the present invention is adjustable to accept standard manufactured tools with various side cutting edge angles. It will be seen also from the aforedescribed structure that two or more such adjustments may be incorporated into one tool holder.

An adjustment of the tool holder is accomplished by means of the cam 19 which is disposed with its axis parallel to the base wall or surface 14 of the tool slot and square to the sides of the tool block 11. The tool slot in the head 11 is thus provided with a fixed end or pivot fulcrum 18 at one end of the tool slot and an adjustable tool positioning means at the other end of the tool slot. Although the cam 19 is shown as being provided with a socket for a key, it will be understood that the cam head 29 may be extended outwardly so that it may be turned by a wrench, or it may be provided with a knurled outside surface for hand turning. The detent spring 32 exerts an inwardly directed pressure against the detent ball 31 which tracks in the radial groove between the cam head 25 and the cam body 21 to prevent the cam 19 from coming out of the tool holder block 11.

While it will be apparent that the preferred embodiments of the invention herein disclosed are well calculated to fulfill the objects above stated, it will be appreciated that the invention is susceptible to modification, variation and change.

What is claimed is:

1. A turning tool holder comprising:
   a. a shank;
   b. a tool block carried by said shank and provided with a turning tool slot having an angled base wall for holding a turning tool having a first side cutting edge angle;
   c. adjustable means extendable into said turning tool slot for positioning turning tools having various side cutting edge angles different than said first side cutting edge angle in said tool block;
   d. means for retaining a turning tool in said tool slot;
   e. said adjustable means comprising an adjustable cam means having at least one portion thereon extended into said turning tool slot for engagement with a turning tool in said slot to position a turning tool in said slot with the tool engaging one end of the angled base wall of the slot, and said cam means portion extended into said slot engaging said tool at a point on the tool spaced apart from said one end of said angled base wall of the slot; and,
   f. said adjustable cam means comprising a rotatable cam having at least one notch formed therein to provide a plurality of portions that extend into said tool slot different distances for positioning tools having various side cutting edge angles.

2. A turning tool holder as defined in claim 1, including:
   a. means for retaining said rotatable cam in an adjusted position.

3. A turning tool holder as defined in claim 1, wherein:
   a. said rotatable cam is provided with a plurality of notches.

4. A turning tool holder as defined in claim 2, wherein:
   a. said retaining means comprises a spring biased detent means.

* * * * *